UNITED STATES PATENT OFFICE.

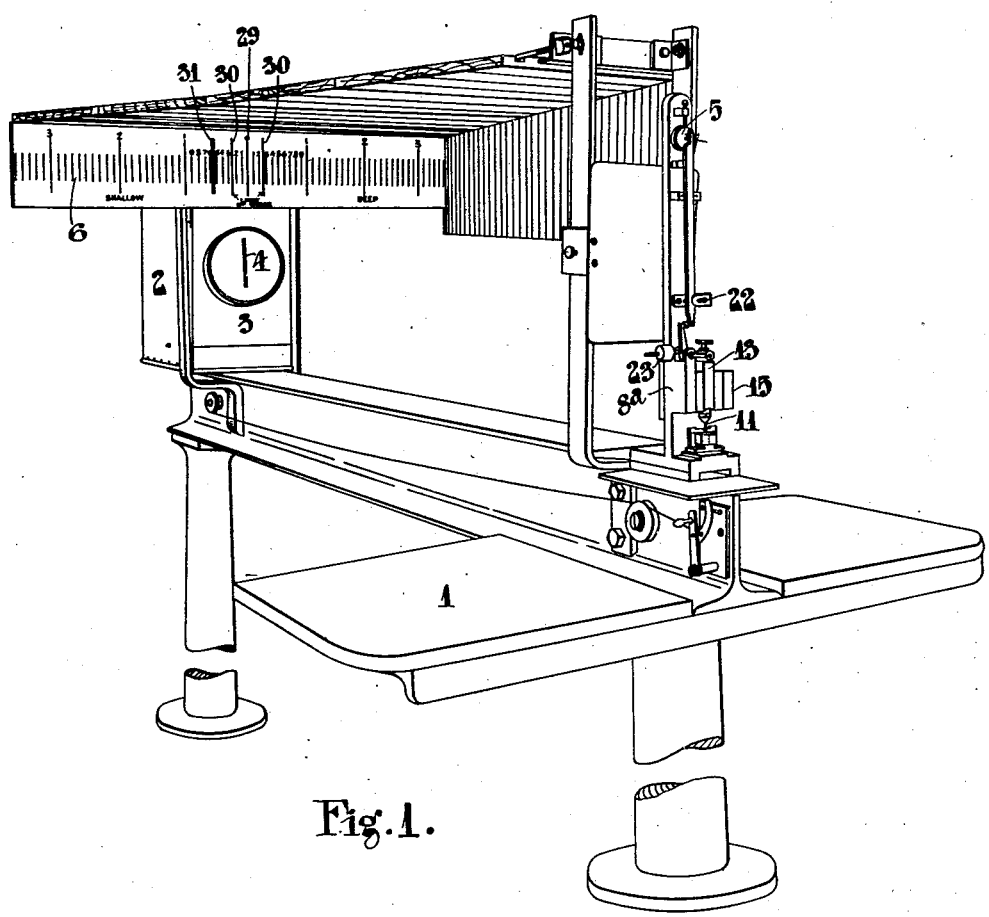

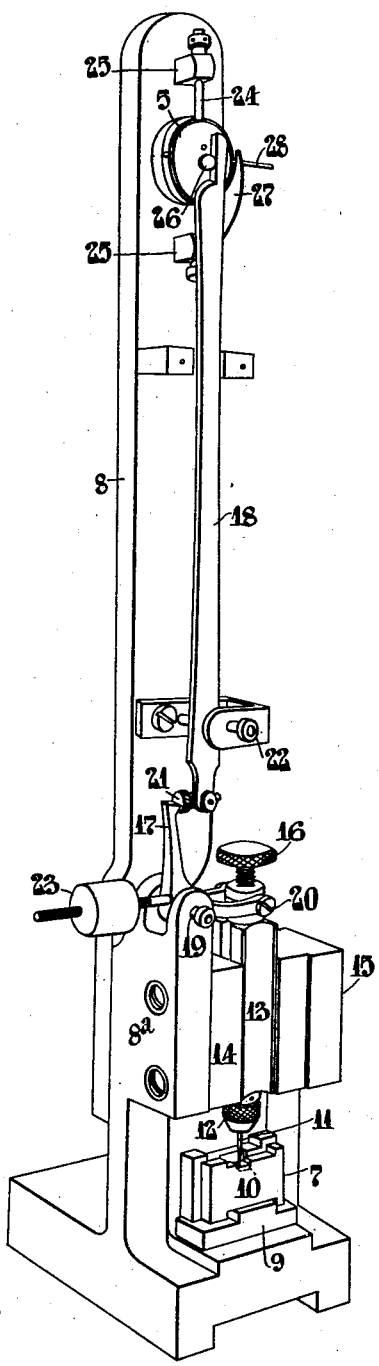

CHARLES HENRY PRICHARD AND FREDERICK WILLIAM WETHERELL, OF BROADHEATH, ENGLAND, ASSIGNORS TO LINOTYPE AND MACHINERY LIMITED, OF LONDON, ENGLAND.

MEANS FOR MEASURING OR CHECK-MEASURING THE DIMENSIONS OF SOLID BODIES.

1,234,702.    Specification of Letters Patent.    Patented July 24, 1917.

Application filed March 9, 1914. Serial No. 823,335.

*To all whom it may concern:*

Be it known that we, CHARLES HENRY PRICHARD and FREDERICK WILLIAM WETHERELL, subjects of the King of the United Kingdom of Great Britain and Ireland, and residing at Linotype and Machinery Works, Broadheath, in the county of Chester, England, have invented new and useful Improvements in Means for Measuring or Check-Measuring the Dimensions of Solid Bodies, of which the following is a specification.

The present invention relates to improvements in method of and instruments for measuring or check measuring the dimensions of solid bodies; and has for its object an instrument capable of determining such dimensions more readily and with greater accuracy than can be done by known instruments devised or used for that purpose.

It consists in the magnification of the linear error in the dimension to be measured or check measured, embodying that magnification in the arcual divergence, from a position parallel with a scale enlarged as compared with the said dimension and continued in opposite directions from a central zero line, of a pivoted mirror located opposite to the said scale and receiving an indicating image in the form of a projected bar of light, or a shadow, alined with the said zero line, the action being that whereas the bar or shadow reflected by the mirror, would strike and coincide with the zero line in the event of no error, the existence of error turns the mirror on its pivot, thereby making the bar or the shadow, as the case may be, travel along the scale from the zero line in the direction corresponding with that of the turning, after the manner of the mirror, shadow, and scale of the well-known Thomson mirror galvanometer, and thereby indicating legibly the degree of error.

The magnification above mentioned may be effected by any suitable means. A lever mechanism characterized by the fact that each interaction of its members is in the form of pressure by only one and the same side of one member upon only one and the same side of the next member, is found to give satisfactory results, because there is no risk of backlash with it.

The invention is particularly applicable to measuring, or check measuring, and indicating the exactitude, or the degree of error, as the case may be, in the depth of the formative cavities of type founders' matrices. The term formative cavity is to be understood as the mold for the character-part of a type considered independently of the body, which latter is the character-supporting part. There are many forms of these matrices known at the present time, but they are all, and must be, subject to the condition that exactitude in every one of their dimensions other than depth of formative cavity is not sufficient, because if that depth is either too much or too little, the respective type or types will be either too high or too low to paper. That is to say, inexactitude in depth, suffices to condemn any matrix exact in all other respects.

The accompanying figures illustrate a preferred constructional form of the application of the invention to the matrices of the well known Mergenthaler composing machine sold under the trade mark "Linotype." In them Figure 1 is a perspective view of the entire instrument in action; and Fig. 2, a perspective view of the stand and column that carry the lever mechanism, out of action.

1 is the upper part of the table supporting the so-called stand and the column at a convenient height; 2, the lantern, the front 3 of it constituting an opaque screen; 4 a vertical slit in the screen 3 and through which a correspondingly vertical bar of light is projected by suitable well known means, upon the mirror 5; and 6, the scale.

Any suitable illuminant may be used as the source of the bar of light. Preference is given to one which has nothing which can, in conjunction with the reflector in the lantern 2, be causative of a shadow in the said bar. An incandescent gas burner is a satisfactory illuminant from this point of view, but an incandescent electric lamp is not, because the reflector projects the shadow of its filament.

The respective positions of the slit 4, the mirror 5, and the scale 6, are according to the principle of the galvanometer above mentioned. The reflector in the lantern 2 is a parabolic one.

The depth of the formative cavity in a matrix is, as a dimension, not a long one. In fact it is so short and the necessity of exactitude so great, that a ten-thousandth of an inch has been chosen as a suitable unit for the expression of it. Fig. 2 shows a partially finished Mergenthaler matrix 7 temporarily and quite steadily supported on the face of the stand 8ª of the instrument, by a seating 9 so as to present its formative cavity 10 (indicated by dotted lines) to the action of a feeling needle 11. The figure shows the needle in its inoperative position, i. e., standing clear of the surface in which the cavity 10 is punched. The needle and the parts connecting it to the mirror 5, are arranged for convenience, vertically under the latter. This needle is fast in the bottom end of a chuck 12 adjustable in a slide 13 capable of a reciprocating vertical motion in a suitable guide fast to the stand 8ª. This guide has, preferably, the form of a ball race between two blocks 14, 15. 16 is a milled-head-adjusting screw working through the slide 13 and connected with the chuck 12 so as to be capable of a fine vertical adjustment. As the needle 11 is circular in cross section, the chuck 12 may be circular also and screw on to the screw 16.

The needle 11 is connected with the mirror 5 by a lever mechanism and a pin projecting horizontally from the mirror's axis. That lever mechanism consists of two levers 17, 18. The former is a bell-cranked one having arms of about equal length and pivoted on the stand 8ª at 19 to rock in a plane parallel with the scale 6. The outer end of its horizontal and lower arm, is pivotally connected, as by a fork-and-pin device 20, with the top of the slide 13, while the outer end of its vertical arm is kept operatively in constant engagement with the adjacent arm of the lever 18, by a contact piece 21 connected with the last-named arm and adjustable to and from the said vertical arm. The lever 18 is of the first order and vertical. It is pivoted on the column 8 at 22 to rock in the same plane as the lever 17, but the proportion of that one of its arms with which the lever 17 engages, to the other one, is relied on for part of the magnification above mentioned. A suitable proportion is 1 to 7.

Each of the pivots 19 and 22 is capable of very fine adjustment so as to insure perfect sensitiveness and freedom of action. 23 is an adjustable counterpoise so connected with the lever 17 that the needle carrier—viz., the parts 12, 13 and 16—shall practically have weight only enough to bring the point of the needle 11 just into contact with the bottom of the cavity 10. This arrangement has also the advantage of providing that the needle shall drop by gravity of a constant amount, thereby eliminating the human element in applying it to the said bottom.

The mirror 5 is mounted on a vertical axis 24 turning in bearings 25 carried by the column 8. These bearings are of any known kind that insures unchecked freedom of turning motion on the part of the mirror. 26 is the pin above mentioned. It projects axially from the back of the mirror 5, and the top end of the lever 18 engages with it so as to turn the mirror 5 when the descent of the needle 11 into the cavity 10, rocks the said lever in the corresponding direction. Thus the engagements between levers 17 and 18 and between the lever 18 and the pin 26, are on opposite sides of the pivot 22 of the said lever 18. 27 is a spring carried by the column 8 and bearing upon a pin 28 projecting from the mirror 5, the arrangement being such that the spring will keep the mirror in contact with the lever 18 and make the bottom end of the latter follow the vertical arm of the lever 17.

The enlargement of the scale 6 is sufficient to make its divisions easily legible by the operator seated at the table 1 and in front of the column 8. Each of them represents one accepted unit. 29 is the central zero line, and from it the scale reads off right and left. 30 is a line on each side of the line 29 indicating the allowable limits of error.

The action of the invention is as follows: The lantern 2 is lighted and the instrument is tested to ascertain if it is correctly adjusted for the bodies to be measured or check-measured, by raising the needle 11 and seating on the base of the stand 8ª, a block of such a height that it will hold its top face in the plane which would be occupied by the exactly positioned surface of one of the said bodies, and allowing the needle 11 to drop on to the said top face. If the reflected bar of light then coincides with the line 29, the instrument is correctly adjusted to deal with the said bodies, and if the bar does not so coincide, the milled head 16 is moved in the required direction until it does. The bottom of a formative cavity 10 is, if the latter is of the proper depth and when the respective matrix 7 is on the seating 9, an instance of the "exactly positioned surface" just mentioned.

The adjustment of the instrument having been effected, the work of measuring the said bodies is proceeded with. The needle 11 is raised and one of them, e. g., a matrix 7, is seated on the seating. The needle is then allowed to drop till its point rests upon the bottom face of the cavity 10. The reflected bar of light will coincide with the line 29, if that depth is exact. If it is too shallow, the degree of shallowness will be indicated on the scale 6 to the left of the said line, and if the depth is too deep, the degree of excess depth will be indicated on the said scale to the right of the line 29. Should the degree of either shallowness or excess depth, exceed the respective limit of error, the matrix is condemned. If, on the other hand, the degree of error is within the limits, the matrix is passed. Fig. 1 shows by the position of the reflection 31, that the matrix being measured, has a cavity too shallow by 5½ ten-thousandths. As this is outside the allowed limit of error, it follows that that matrix will be condemned.

A milled headed screw or equivalent adjustable through the back of the stand 8ª may be provided for adjusting to position under the needle, matrices of varying thickness.

Having now described our invention we declare that what we claim and desire to secure by Letters Patent is:

1. In an apparatus for testing the depth of formative cavities in matrix bodies for comparison with the known cavity depth in a pattern matrix, the combination of a sustaining frame having a supporting surface to support the matrices to be tested with the cavity exposed, a movable feeler guided in the frame and adapted to be manually manipulated to contact with the surface to be tested, a mirror mounted in the frame to rock on an axis, intermediate connections extending from the feeler to the mirror and adapted in the movements of the feeler to rock the mirror on its axis, means for projecting an image on the mirror, and an index scale in position to receive the reflection of the image, said scale being calibrated in accordance with the deflections of the image due to the movement of the mirror by the feeler and connecting devices, and said scale having a zero point with which the image will coincide when the feeler contacts with the pattern surface; whereby when the matrix to be tested is substituted for the pattern matrix, and the said feeler engaged with the surface of the cavity therein, the position of the image on the scale relatively to said zero point will indicate the accuracy or inaccuracy, as the case may be, of the cavity depth.

2. In an apparatus for testing the depth of formative cavities in matrix bodies for comparison with the known cavity depth in a pattern matrix, the combination of a sustaining frame having a supporting surface to support the matrices to be tested with the cavity exposed, a movable feeler guided in the frame and adapted to be manually manipulated to contact with the surface to be tested, a mirror mounted in the frame to rock on an axis, intermediate connections extending from the feeler to the mirror and adapted in the movements of the feeler to rock the mirror on its axis, means for projecting an image on the mirror, an index scale in position to receive the reflection of the image, said scale being calibrated in accordance with the deflections of the image due to the movement of the mirror by the feeler and connecting devices, and said scale having a zero point with which the image will coincide when the feeler contacts with the pattern surface; whereby when the matrix to be tested is substituted for the pattern matrix, and the said feeler engaged with the surface of the cavity therein, the position of the image on the scale relatively to said zero point will indicate the accuracy or inaccuracy, as the case may be, of the cavity depth, and means for adjusting at will the relation of the feeler to the mirror to effect coincidence of the image with the zero point when cavities of different depths are to be measured.

3. In an apparatus of the type described, the combination of a horizontal scale, a mirror rockable about a vertical axis, means for projecting an image on said mirror, means situated below the mirror for supporting the body to be measured, a vertically movable feeler to contact with said body, an upright actuating lever pivoted near its lower end on a horizontal axis extending at right angles to the scale, the upper end of said lever engaging the mirror to rock the same on its axis, and an elbow lever pivoted on a horizontal axis parallel with the axis of the actuating lever, one arm of said elbow lever engaging the lower end of the actuating lever, and the other arm of the elbow lever being pivoted to the feeler.

4. In an apparatus of the type described, the combination of a horizontal scale, a mirror rockable about a vertical axis and provided with a horizontal actuating pin, means for projecting an image on the mirror, means situated below the mirror for supporting the body to be measured, a vertically movable feeler adapted to contact with said body, an upright actuating lever pivoted between its ends on a horizontal axis, the said lever engaging above its axis with the actuating pin on one side of the same to rock the mirror, and a member jointed to the feeler and engaging the actuating lever below its axis on the same side of the lever as that engaged by the pin.

5. In an apparatus of the type described, the combination of a horizontal scale, a mirror pivoted to rock about a vertical axis, means for projecting an image on the mirror, an upright actuating lever pivoted between its ends, the upper end of said lever loosely engaging the mirror to rock the same, means for supporting the body to be measured, a vertically movable feeler to contact with said body, an elbow lever pivotally supported and provided with arms extending horizontally and vertically respectively from its pivotal support, the horizontal arm being jointed to the feeler and the vertical arm engaging the actuating lever below its axis, and a counterweight carried by the elbow lever to counterbalance the weight of the feeler.

In witness whereof we have hereunto set our hands in the presence of two witnesses.

CHARLES HENRY PRICHARD.
FREDERICK WILLIAM WETHERELL.

Witnesses:
MALCOLM SMETHURST,
GEORGE WEAVER.